United States Patent [19]
Luken

[11] Patent Number: 5,923,334
[45] Date of Patent: Jul. 13, 1999

[54] POLYHEDRAL ENVIRONMENT MAP UTILIZING A TRIANGULAR DATA STRUCTURE

[75] Inventor: William Louis Luken, Yorktown Heights, N.Y.

[73] Assignee: International Business Machines Corporation, Armonk, N.Y.

[21] Appl. No.: 08/720,321

[22] Filed: Sep. 27, 1996

Related U.S. Application Data

[60] Provisional application No. 60/023,143, Aug. 5, 1996, provisional application No. 60/022,424, Aug. 5, 1996, and provisional application No. 60/022,428, Aug. 5, 1996.

[51] Int. Cl.$^6$ .................................................. G06T 11/40
[52] U.S. Cl. ........................................... 345/423; 345/425
[58] Field of Search .................................... 345/419, 420, 345/421, 423, 425, 430, 431

[56] References Cited

U.S. PATENT DOCUMENTS

| | | | |
|---|---|---|---|
| 5,396,583 | 3/1995 | Chen et al. | 345/427 |
| 5,495,562 | 2/1996 | Denney et al. | 345/421 |
| 5,561,756 | 10/1996 | Miller et al. | 345/437 |
| 5,704,024 | 12/1997 | Voorhies et al. | 345/426 |

OTHER PUBLICATIONS

QuickTime VR—An Image-Based Approach to Virtual Environment Navigation, Shenchang Eric Chen, Apple Computer, Inc., Siggraph, Computer Graphics Proceedings, Annual Conference Series, 1995, pp. 29–38.

*Primary Examiner*—Mark K. Zimmerman
*Attorney, Agent, or Firm*—Jay P. Sbrollini; Perman & Green, LLP

[57] ABSTRACT

The present invention generates an environment map by storing in memory color values associated with pixels of an image representing the panoramic scene. For at least one element of each facet of the environment map, a mapping operation is performed that comprises the following steps. A direction vector is generated that corresponds to the element. A pixel of the image that corresponds to the direction vector is determined. A color value is derived based upon a stored color value associated with the pixel of the image, and the derived color value is stored at a location in memory associated with the element of the environment map. A view of the environment map is generated by determining a view window corresponding to a field of view. The view window comprises an array of pixels identified by a plurality of rows and columns. The environment map is mapped to the view window for display. The mapping step includes the following steps for each pixel of the view window. A direction vector is generated that corresponds to the pixel of the view window. A facet of the environment map intersected by the direction vector is determined. An element of the intersected facet which corresponds to the direction vector is determined. A color value is derived based upon a color value of the element of the environment map corresponding to the direction vector, and the derived color value is stored as the color value of the pixel of the view window for display.

22 Claims, 14 Drawing Sheets

| A (0,0) | A (1,0) | A (2,0) | • • • | A (ncol-1,0) |
| A (0,1) | A (1,1) | A (2,1) | • • • | A (ncol-1,1) |
| A (0,2) | A (1,2) | A (2,2) | • • • | A (ncol-1,2) |

⋮

A (0,nrow-1)  A (1,nrow-1)  A (2,nrow-1)  • • •  A (ncol-1,nrow-1)

Fig. 2

POLYHEDRAL ENVIRONMENT MAP UTILIZING A TRIANGULAR DATA STRUCTURE

CROSS REFERENCE TO RELATED APPLICATIONS

The present application claims the benifit of U.S. patent application Ser. No. 60/023,143, U.S. patent application Ser. No. 60/022,424 and U.S. patent application Ser. No. 60/022,428, filed on Aug. 5, 1996 and assigned to the common assignee of the present invention, herein incorporated by reference in their entirety.

BACKGROUND OF THE INVENTION

1. Technical Field

The invention relates generally to image processing systems, and, more particularly, to image processing systems that utilize polyhedral environment maps to create and view three dimensional images from data representing multiple views of a scene.

2. Description of the Related Art

An environment map is a data structure representing the colors and/or other information that is characteristic of a set of samples defined with respect to a fixed point in space. A complete environment contains data for a set of directional samples distributed over all possible angles ($4\pi^2$ steradians). A partial environment map may represent any subset of the possible solid angles. The directional samples are all defined with respect to a single point in space which forms the origin or center of the environment map.

The data contained in an environment map may be used to determine an image that is characteristic of any direction and field of view contained within the solid angles represented by the environment map. The image is typically composed of a rectangular grid of elements or pixels, each of which is characteristic of a direction with respect to the origin of the environment map. The characteristic direction the elements of the image may be associated with one or more directional samples of the environment map. In the simplest case, known as a point-sampled image, each element of the image is associated with the single sample of the environment map that corresponds to a direction that most closely matches the direction associated with the element of the image. More elaborate sampling and filtering techniques are also possible in which each element of the image is associated with multiple samples of the environment map that corresponds to directions that match the directions associated with the element of the image.

An environment map may also be used to approximate the effects of light reflected by the surface of a three dimensional object located at or near the origin of the environment map. For example, consider a point on a three dimensional object which is characterized by coordinates (xp,yp,zp) and a unit normal vector N. In order to generate a view of the object from a direction DO, the color associated with the object at the coordinates (xp,yp,zp) may be determined partly or entirely by the values of the environment associated with the Direction De=D−2N*(N·D).

In principle, any set of flat or curved surfaces may be used to define an environment map. For example, the QuicktimeVR product from Apple Corp of Cupertino, Calif., utilizes a cylindrical environment map to support panoramic image generation and the RenderMan product from Pixar Animation Studios of Port Richmond, Calif. uses both spherical environment maps and environment maps based on six sides of a cube. All of these examples take advantage of the ability to represent the constituent surfaces with a rectangular two dimensional coordinate system. The cylindrical environment map is based on azimuth and elevational coordinates. The spherical environment map uses latitude and longitude coordinates. The cube-face environment map utilizes standard row and column addressing for each of the six faces of the cube.

Each of these environment maps have distinct limitations that restrict their usefulness.

The spherical environment map has an inefficient distribution of samples with higher densities of samples near the poles of the sphere than around the equator of the sphere. In principle, a sphere treats all directions is space equally. However, imposition of a latitude and longitude coordinate system on a sphere breaks this symmetry and requires designation of a preferred axis (i.e., the polar axis) in space. This leads to unequal treatment of the polar regions with respect to the equatorial regions. The use of latitude and longitude coordinate system also tends to require frequent evaluation of trigonometric functions which may be prohibitively intensive for use in some applications and/or systems.

More specifically, the choice of the direction of the polar axis of the spherical environment map is completely arbitrary; and, after choosing the direction of the polar axis, the resulting combination of a sphere and polar axis no longer has the full symmetry of the sphere itself. Only the symmetry of a cylinder remains. Thus, it is possible to rotate the sphere and polar axis combination about the polar axis without changing the polar axis, but rotating this combination about any other direction moves the polar axis. Moving the polar axis is equivalent to choosing a new polar axis, and this does not preserve the original polar axis choice.

After choosing a polar axis, a latitude and longitude coordinate system may be defined. The latitude and longitude coordinate system include an angle θ running from π/2 at one pole to −π/2 at the other pole, and a second (azimuthal) angle φ running from 0 to 2π starting at some arbitrary direction perpendicular to the polar axis. The resulting lines of constant θ and constant φ converge on the poles. Near the "equator" (the line with θ=0), the lines of constant θ and φ form a rectangular grid. Near the poles, however, the lines of constant θ (latitude) form concentric circles around the poles, and lines of constant φ (longitude) form spokes radiating from the poles. The circles and spokes patterns seen near the poles is quite distinct from the grid pattern seen near the equator, but the underlying sphere has exactly the same shape in both regions. The circles and spokes patterns seen near the poles are not properties of the sphere itself. These are only consequences of the arbitrary decision to impose a polar axis on the sphere.

In contrast, the cylindrical and cube-face environment maps have relatively uniform distributions of directional samples. However, the cylindrical environment is open at both ends which prevents it from being used for view directions approaching the axis of the cylinder. The ends of the cylinder may be capped with additional top and bottom images as set forth in U.S. patent application Ser. No. 60/023,143, filed on Aug. 5, 1996 and commonly assigned to the assignee of the present application, incorporated by reference above in its entirety. However, the resulting data structure requires special treatment for directions having elevations above, within, or below the cylindrical data. In addition, the algorithms required for viewing the top and bottom images may be more laborious than the algorithms required to view the data within the cylindrical region.

With respect to the cube-face environment map, the algorithms required to determine which faces of the cube are intersected by the viewing frustrum are computationally intensive, and may impact the performance of the system.

Thus, there is a need in the art to provide for an efficient system for generating and viewing three dimensional panoramic images based environment maps, and thus provide an improved level of interactive graphical feedback.

SUMMARY OF THE INVENTION

The above-stated problems and related problems of the prior art are solved with the principles of the present invention, polyhedral environment map utilizing a triangular data structure. The environment map of the present invention represents a panoramic scene and comprises a plurality of triangular facets each partitioned into a triangular grid of elements. Each element is associated with a color value representing color of the corresponding element. The environment map of the present invention is generated by storing in memory color values associated with elements of an image representing the panoramic scene. For at least one element of each facet of the environment map, a mapping operation is performed that comprises the following steps. A direction vector is generated that corresponds to the element. An element of the image representing the panoramic scene that corresponds to the direction vector is determined. A color value is derived based upon a stored color value associated with the element of the image, and the derived color value is stored at a location in memory associated with the element of the environment map.

A view of the environment map of the present invention is generated by determining a view window corresponding to a field of view. The view window comprises an array of pixels identified by a plurality of rows and columns. The environment map is mapped to the view window for display. The mapping step includes the following steps for each pixel of the view window. A direction vector is generated that corresponds to the pixel of the view window. A facet of the environment map intersected by the direction vector is determined. An element of the intersected facet which corresponds to the direction vector is determined. A color value is derived based upon a color value of the element of the environment map corresponding to the direction vector, and the derived color value is stored as the color value of the pixel of the view window for display.

The environment map of the present invention as described above provides for improved performance in rendering the environment map. This improved performance results from the use of a triangular data structure in defining the environment map, which provides an efficient mechanism for determining which face of the environment map is intersected by the direction vectors that correspond to the pixels of the view window when mapping the environment map to the view window.

BRIEF DESCRIPTION OF THE DRAWINGS

FIG. 2 is a pictorial illustration of a rectangular data structure.

DETAILED DESCRIPTION OF THE PRESENT INVENTION

Figure 1:
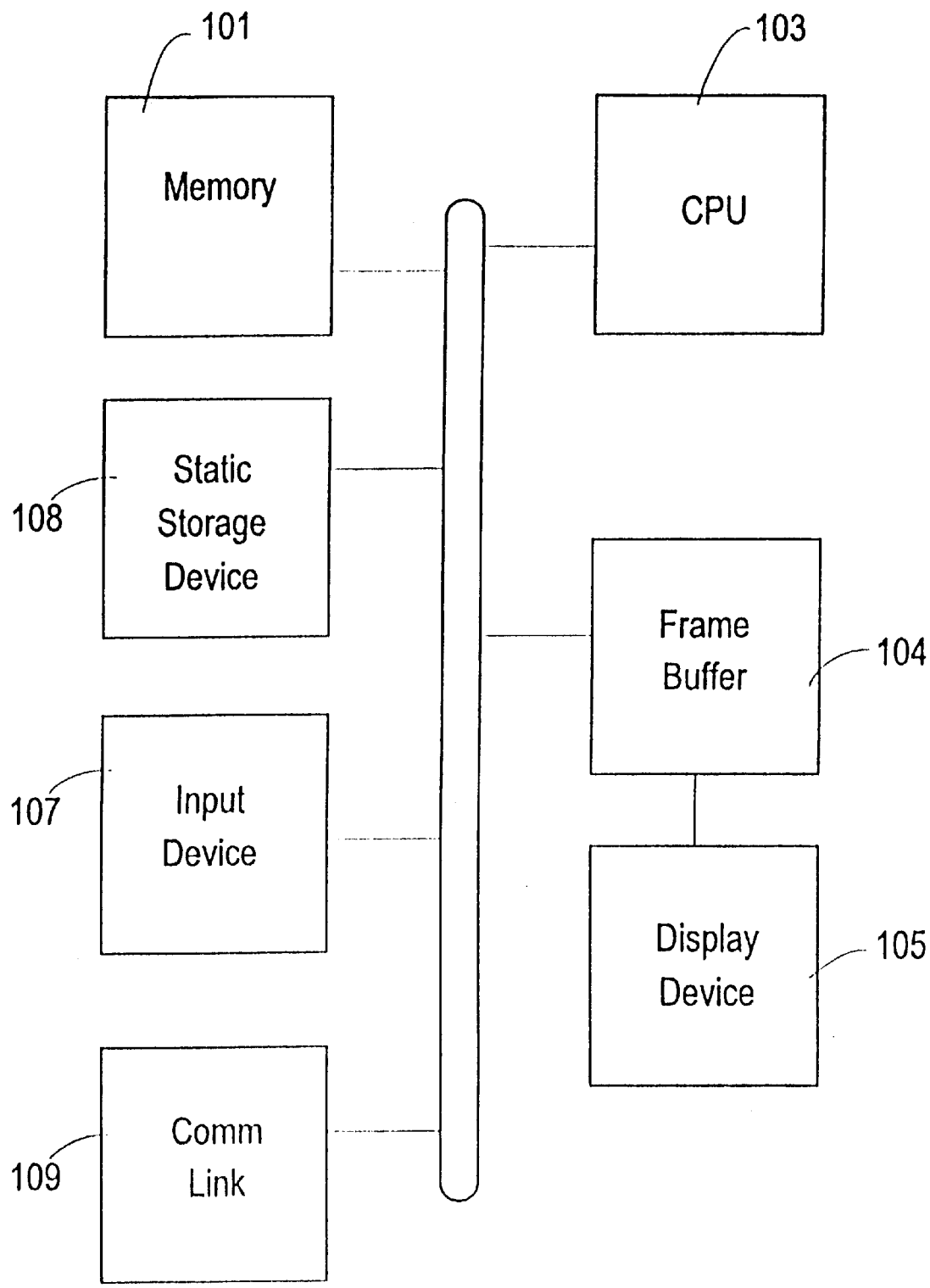
FIG. 1 is a functional block diagram of a computer processing system that may be utilized by the preferred embodiment of the present invention.

A method and apparatus for generating an image from a polyhedral environment map that utilizes a triangular data structure is set forth herein. The present invention may be implemented on any computer processing system including, for example, a personal computer, a workstation, or a graphics adapter that works in conjunction with a personal computer or workstation. As shown in FIG. 1, a computer processing system as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes non-volatile storage, such as a read only memory (ROM), and/or other non-volatile storage devices 108, such as a fixed disk drive, that stores an operating system and one or more application programs that are loaded into the memory 101 and executed by the CPU 103. In the execution of the operating system and application program(s), the CPU may use data stored in the non-volatile storage device 108 and/or memory 101.

In addition, the computer processing system includes a frame buffer 104 coupled between the CPU 103 and a display device 105 such as a CRT display or LCD display. The frame buffer 104 contains pixel data for driving the display device 105. In some systems, a rendering device (not shown), also known as a graphics accelerator, may be coupled between the CPU 103 and the frame buffer 104.

In addition, the computer processing system may include a communication link 109 (such as a network adapter, RF link, or modem) coupled to the CPU 103 that allows the CPU 103 to communicate with other computer processing systems over the communication link, for example over the Internet. The CPU 103 may receive portions of the operating system, portions of the application program(s), or portions of the data used by the CPU 103 in executing the operating system and application program(s).

It should be noted that the application program(s) executed by the CPU 103 may perform the rendering methods of the present invention described below. Alternatively, portions or all of the rendering methods described below may be embodied in hardware that works in conjunction with the application program executed by the CPU 103.

What will now be described is the polyhedral environment map that utilizes a triangular data structure, techniques for creating such polyhedral environment maps, and techniques for rendering views of such polyhedral environment maps.

In order to illustrate a polyhedron environment map that utilizes a triangular data structure, first consider a conventional rectangular array. As shown in FIG. 2, a rectangular array includes data values stored in a computer's memory as nrow successive blocks of memory each having ncol elements. The address of any element may be calculated as follows:

$$A(i,j) = \text{address of } A(0,0) + (\text{size of each element}) * (i + j * (\text{ncol})),$$

where i and j represent the column and row of the element, respectively.

In order to find the data for the element (i, j), one must know the column dimension (ncol), as well as the values of (i) and (j).

Figure 3:
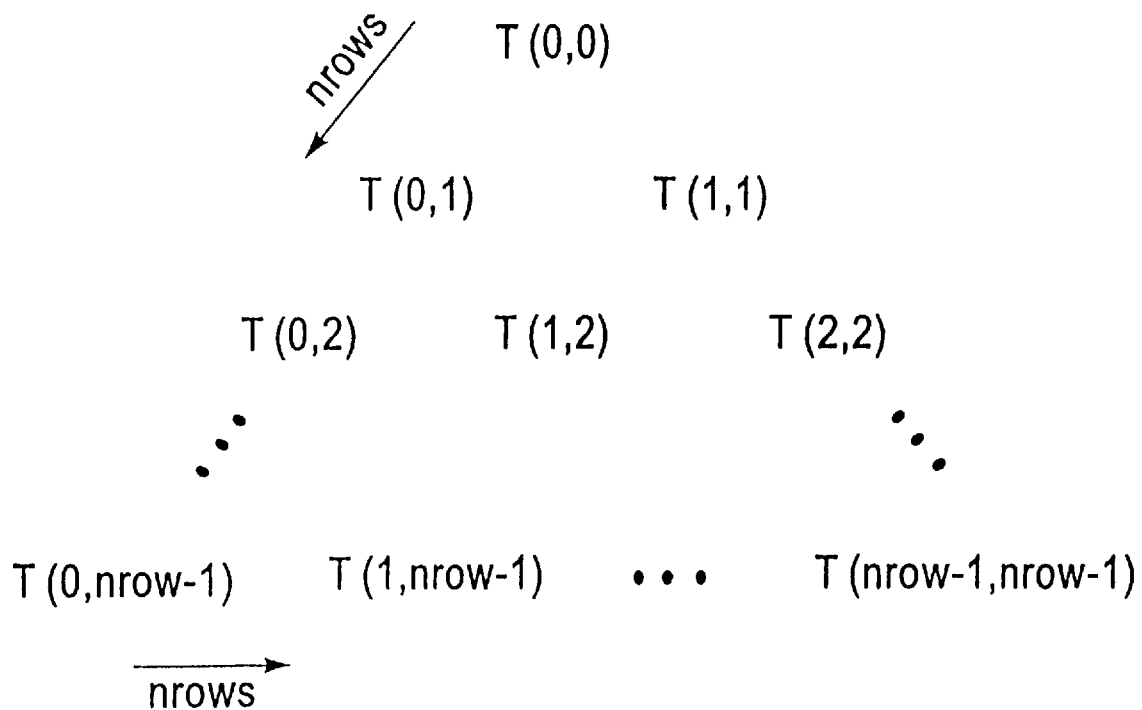
FIG. 3 is a pictorial illustration of a triangular data structure.

A triangular data structure is illustrated in FIG. 3. Instead of every row having ncol elements, the first row has one element, the second row has two elements, etc. Like the rectangular array, a triangular array is mapped into linear memory using a well-defined algorithm. The triangular array, however, uses a different algorithm. Thus, the location of element T(i,j) is determined as follows:

$$T(i,j) = \text{address of } T(0,0) + (\text{size of each element}) * (i + j * (j+1)/2),$$

where i and j represent the column and row of the element, respectively.

Unlike the rectangular array, this does not have independent row and column dimensions. In effect nrow=ncol. Moreover, unlike the rectangular array, it is not necessary to know the array dimension(s) to find the address of any array element (Since the address of the element is based on j*(j+1)/2 instead of j*ncol. Moreover, because j and j+1 are successive integers, one is even and one is odd, so the product j*(j+1) is always even and exactly divisible by 2. In addition, the values of j*(j+1)/2 may be stored in an array to reduce the number of operations needed to generate an address for an element of the array.

According to the present invention, a polyhedral environment map is provided that utilizes a triangular data structure to store the information related to the elements of each facet of the polyhedral environment map. For the sake of description, an octahedral environment map that utilizes such a triangular data structure is set forth below. However, the present invention is not limited in this respect and can be applied to other polyhedral environment maps, for example environment maps based on a tetrahedron or an icosohedron. However, the use of a triangular data structure for the octahedral environment map is particularly advantageous in terms of limiting the computations required to determine which face of the octahedron is associated with a given direction vector (i.e., look at the signs of the x, y, and z values).

Figure 4:
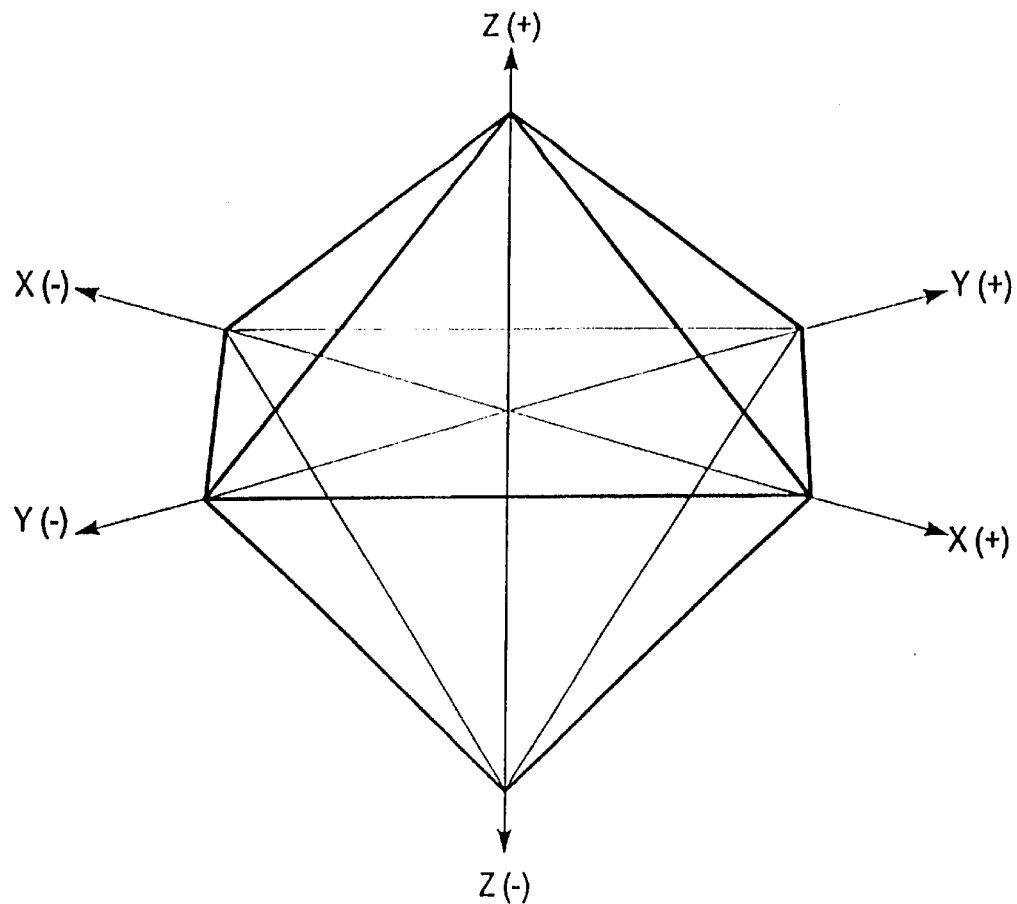
FIG. 4 is a pictorial illustration of the eight faces of an octahedral environment map.
Figure 5:
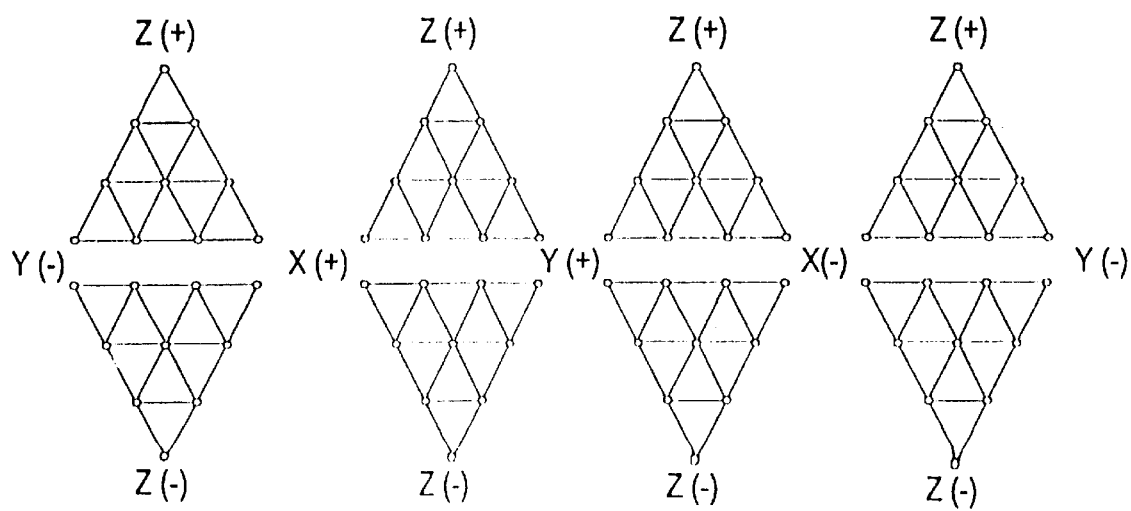
FIG. 5 illustrates the mapping of the triangular data structure of FIG. 3 to each of the eight faces of the octahedral environment map of FIG. 4 according to the present invention.

FIG. 3 shows an octahedron with its eight faces and the three coordinate axes x,y,z. Each coordinate axis is divided into (+) and (−) directions associated with the six vertices of the octahedron. FIG. 4 shows the eight faces of the octahedron with corners labelled by the corresponding coordinate axes and directions. Each face is partitioned into a triangular grid of elements (or pixels), for example a 4×4 triangular grid of elements as shown. For each element of the grid of elements, the triangular data structure preferably stores information that is associated with the element. The information preferably includes color data that identifies the color of the element. The color data may represent the red, green and blue components of the color of the pixel (true color) or an index to a color palette (palette color). The information stored for a given element may also include Z data that represents the depth of the image at the given element. In addition, the information stored for each pixel may include additional data related to the element. For example, the data may be actions related to the element, including, but not limited to, a hyperlink to another panorama, a command to play a sound, or a command to launch an external application.

Figure 6A:
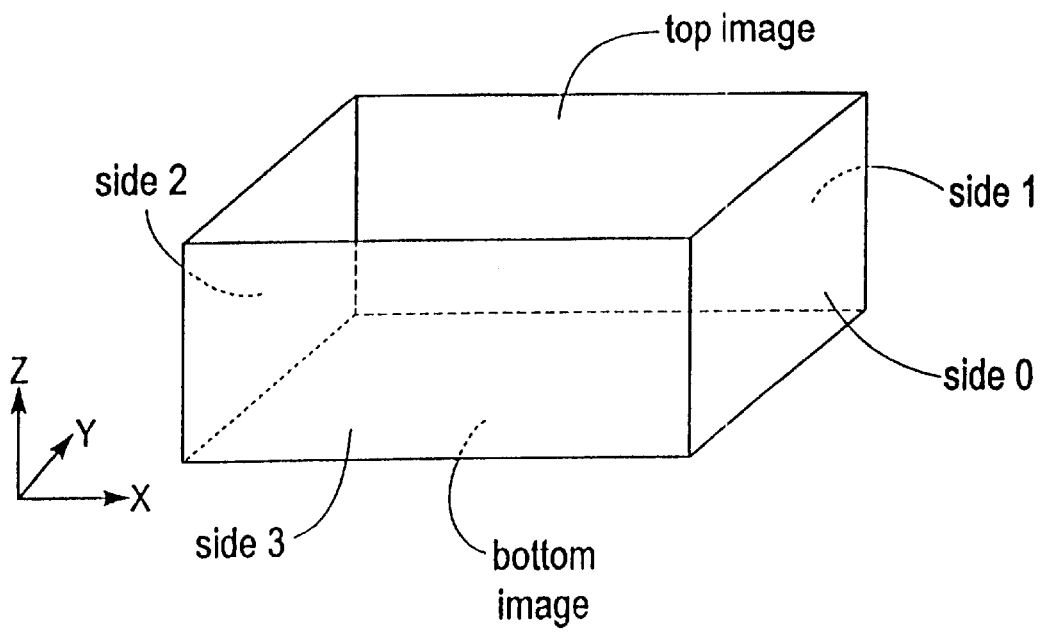
FIGS. 6(A) and (B) illustrate six rectangular images that may be mapped to the octahedral environment map of the present invention.
Figure 6B:
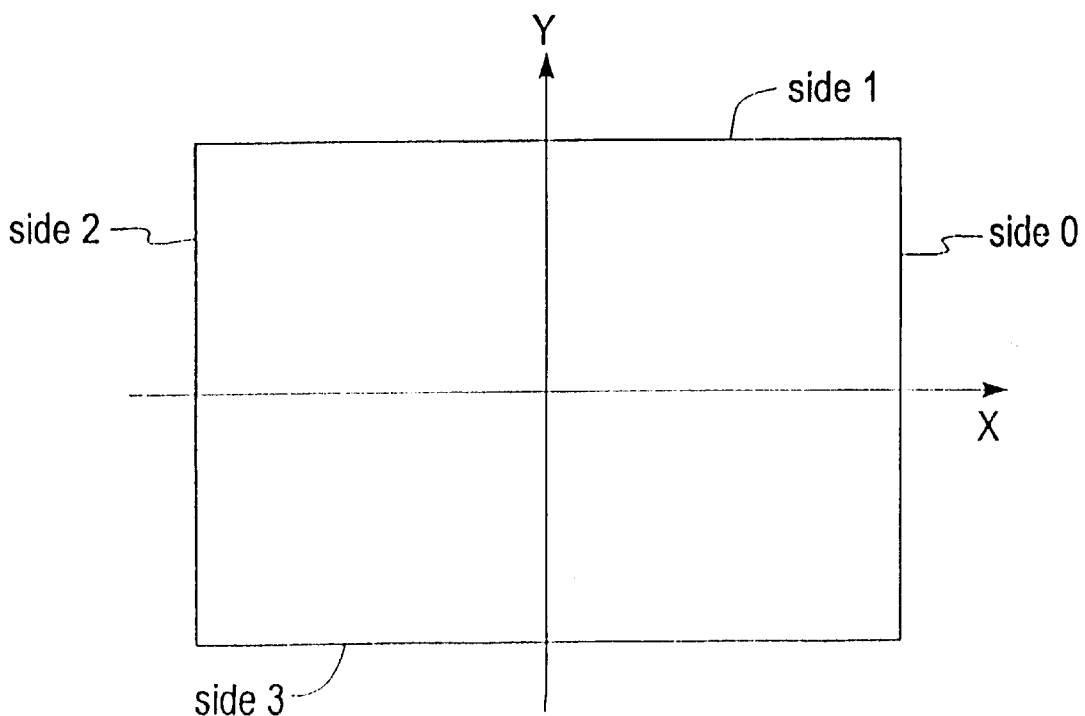

Having described a octahedral environment map that utilizes a triangular data structure to store the information related to the elements of each facet of the octahedron, a technique to map six rectangular images to the octahedral environment map of the present invention is now set forth with reference to FIG. 7. Preferably, the six rectangular images are faces of an axis-aligned rectangular solid as shown in FIG. 6(A). The six images will be referred to as the top image, bottom image, and four side images (side 0, side 1 side 2 and side 3 ). FIG. 6(B) is a top view of xy plane of the rectangular solid of FIG. 6(A) illustrating the four side images. Side 0 is on the positive x axis, side 1 along the positive y axis, side 2 along the negative x axis, and side 3 along the negative y axis.

Figure 7:
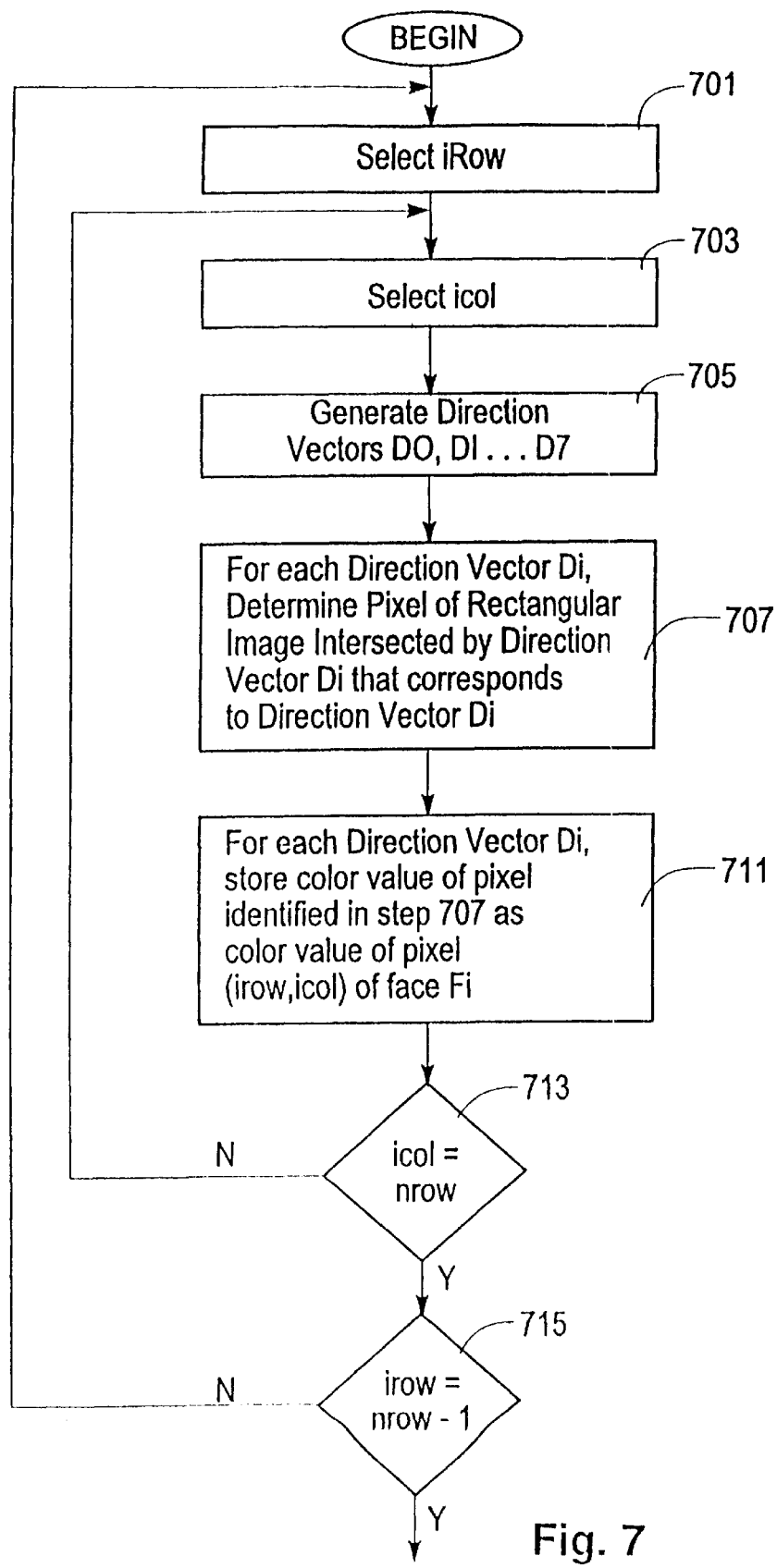
FIG. 7 is a flow chart illustrating operation of mapping the rectangular images of FIGS. 6(A) and (B) to the octahedral environment map of the present invention.

As shown in FIG. 7, the operation of mapping the six rectangular images to the octahedral environment map of the present invention begins in step 701 by selecting a row index irow. In step 703 a column index icol is selected. The value of irow runs from 0 to nrow-1 where nrow is the dimension of the triangular arrays comprising the octahedron. For each value of irow, the value of icol runs from 0 to irow. Each pair of irow and icol values identifies a pixel in each face of the octahedron.

In step 705, for each face of the octahedron, a direction vector is generated that corresponds to the pixel (irow,icol) in the particular face of the octahedron. Preferably, the direction vector corresponding to the pixel (irow,icol) represents the direction from the origin of the octahedron to the pixel (irow, icol). Moreover, the direction vector preferably has the form D=(SxDx,SyDy,SzDz) where Sx,Sy,Sz corresponds to a particular face of the octahedron and Dx,Dy,Dz corresponds to a particular pixel in the faces of the octahedron. Preferably Sx,Sy,Sz is mapped to the faces of the octahedron as follows:

| Face | Sx | Sy | Sz |
|---|---|---|---|
| F0 (+x,+y,+z) | 1 | 1 | 1 |
| F1 (−x,+y,+z) | −1 | 1 | 1 |
| F2 (−x,−y,+z) | −1 | −1 | 1 |
| F3 (+x,−y,+z) | 1 | −1 | 1 |
| F4 (+x,+y,−z) | 1 | 1 | −1 |
| F5 (−x,+y,−z) | −1 | 1 | −1 |
| F6 (−x,−y,−z) | −1 | −1 | −1 |
| F7 (+x,−y,−z) | 1 | −1 | −1 |

This results in the generation of eight direction vectors D0,D1,D2. . . D7 that correspond to the pixel (irow,icol) in each of the eight faces of the octahedron where D0=(Dx,Dy,Dz)
D1=(−Dx,Dy,Dz)
D2=(−Dx,−Dy,Dz)
D3=(Dx,−Dy,Dz)
D4=(Dx,Dy,−Dz)
D5=(−Dx,Dy,−Dz)
D6=(−Dx,−Dy,−Dz)
D7=(Dx,−Dy,−Dz)

An example of a technique that generates the components Dx,Dy,Dz of the direction vectors D0,D1,D2. . . D7is set forth below with respect to FIG. 8.

In step 707, for each of the eight direction vectors D0,D1,D2. . . D7, it is determined which of the six rectangular images is intersected by the direction vector Di (where i ranges from 0 to 7), and which pixel of the particular rectangular image intersected by the direction vector Di corresponds to the direction vector Di. An example of a technique to identify the pixel of the rectangular image that corresponds to the direction vector Di is set forth below with respect to FIG. 9.

In step 711, for each direction vector Di, the color value of the pixel of the rectangular image that corresponds to the direction vector Di is stored as the color value of the pixel (irow,icol) of the face Fi of the octahedral environment map, where face Fi corresponds to the direction vector Di.

In step 713, it is determined if the last column (icol=irow) of the row (irow) of the faces of the octahedron has been processed in steps 705–711. If not, operation returns to step 703 to select the next column index in the range. As described above, the column index ranges from 0 to irow. Otherwise, operation continues to step 715.

In step 715, it is determined if the last row (irow=nrow−1) of the faces of the octahedron has been processed in steps 705–711. If not, operation returns to step 701 to select the next row index in the range. As described above, the row index ranges from 0 to nrow−1. Otherwise, when the last row of the faces of the octahedron have been processed, the operation ends.

Figure 8:
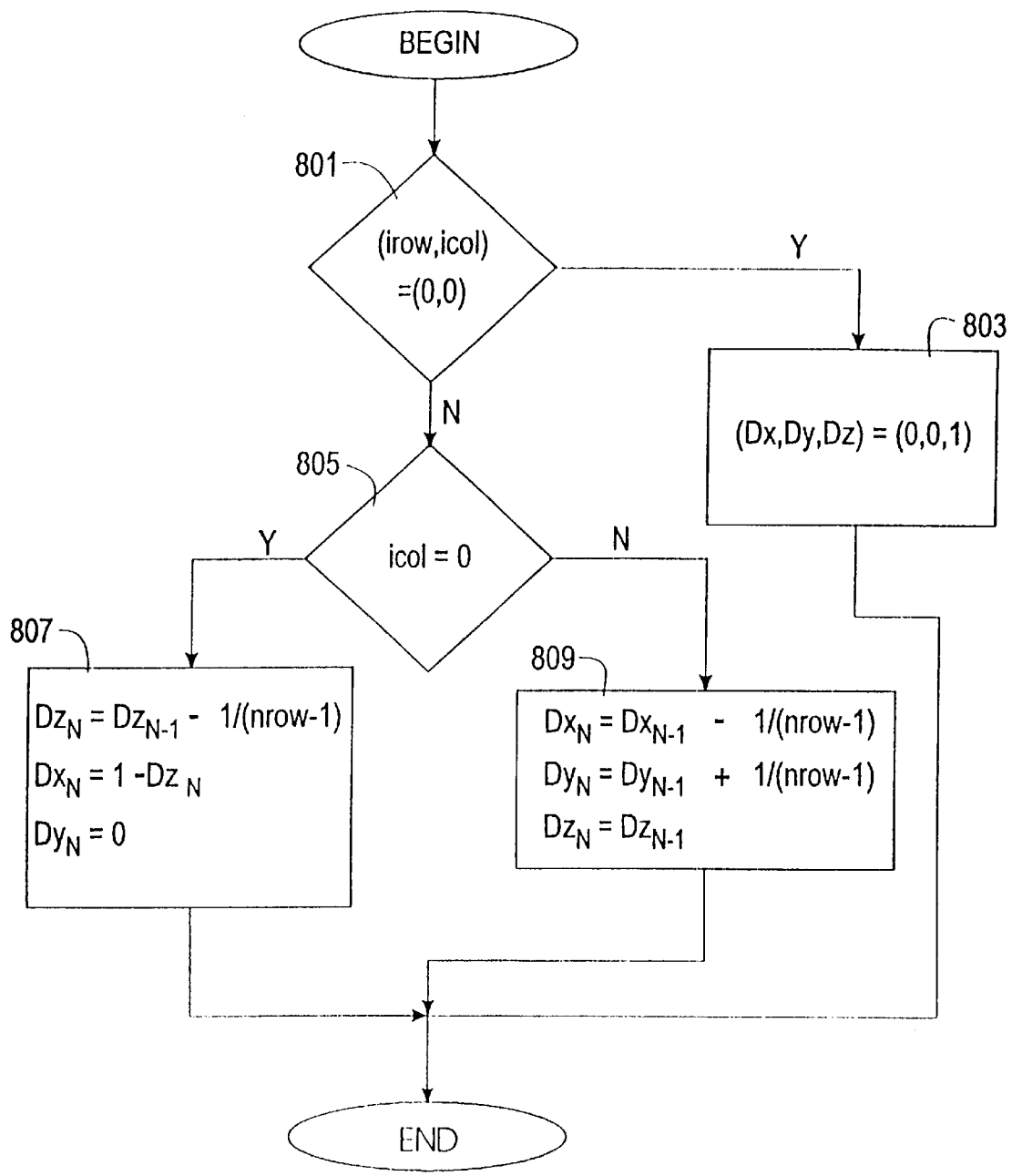
FIG. 8 is a flow chart illustrating the operation of generating the direction vectors D0,D1, . . . D7 for a given pixel element of the faces of the octahedral environment map.

FIG. 8 illustrates a technique for generating the components Dx,Dy,Dz of the direction vectors D0,D1,D2. . . D7for the pixel identified by the indices (irow,icol). The operation begins in step 801 by checking whether the indices (irow, icol) are set to (0,0), thus indicating that the current pixel is the initial pixel of the faces of the octahedron. If in step 801 the indices (irow,icol) are set to (0,0), operation continues to step 803 where the components Dx,Dy,Dz are initialized to values 0,0,1, respectively and the operation ends.

If in step 801 the indices (irow,icol) are not set to (0,0), operation continues to step 805 to check whether the index icol is set to 0, thus indicating that the current pixel is located at the beginning of the row irow on the faces of the octahedron.

If in step 805, it is determined that the index icol is set to 0, then in step 807 the components Dx,Dy,Dz of the current pixel are set as follows:

$Dz_N = Dz_{N-1} - (1/(nrow-1))$ $Dx_N = 1 - DZ_N$ $Dy_N = 0$ where $Dx_N$, $Dy_N$, $Dz_N$ are the Dx,Dy,Dz components for the current pixel (irow,icol) and $Dz_{N-1}$ is the Dz component for the pixels of the previous row, which is identified by the row index (irow=irow−1).

If in step 805 it is determined that the index icol is not set to 0, then in step 809 the components are set as follows:

$Dx_N = Dx_{N-1} - (1/(nrow-1))$ $Dy_N = Dy_{N-1} + (1/(nrow-1))$ $Dz_N = Dz_{N-1}$ where $Dx_N$, $Dy_N$, $Dz_N$ are the Dx,Dy,Dz components for the current pixel (irow,icol) and $Dx_{N-1}$, $Dy_{N-1}$, $Dz_{N-1}$ are the Dx,Dy, Dz components for the previous pixel, which is identified by the indices (irow, icol−1).

Figure 9:
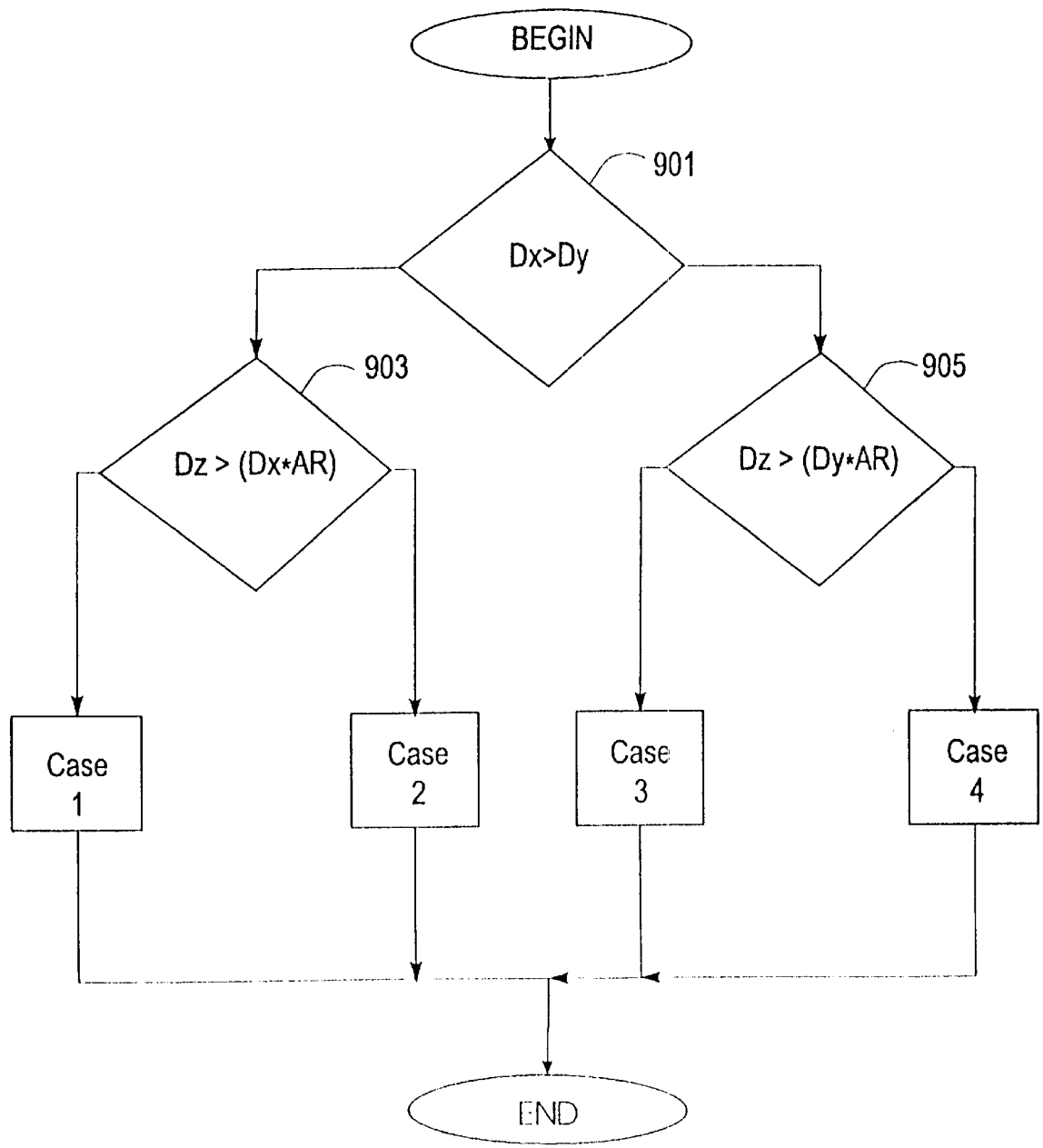
FIG. 9 is a flow chart illustrating the operation of determining the rectangular image intersected by each of the direction vectors D0,D1. . . D7, and for determining the pixel of the intersected image that corresponds to each of the direction vectors D0,D1. . . D7.

FIG. 9 illustrates a technique for identifying the pixel of the rectangular image that correspond to the direction vectors D0,D1. . . D7, respectively. This example assumes that the top and bottom images are square and all four side images have an aspect ratio AR. As described above, the direction vectors D0,D1, . . . D7are composed of the components Dx,Dy,Dz as follows:

D0=(Dx,Dy,Dz)
D1=(−Dx,Dy,Dz)
D2=(−Dx,−Dy,Dz)
D3=(Dx,−Dy,Dz)
D4=(Dx,Dy,−Dz)
D5=(−Dx,Dy,−Dz)
D6=(−Dx,−Dy,−Dz)
D7=(Dx,−Dy,−Dz)

The operation begins in step 901 by comparing Dx to Dy. If Dx is greater than Dy, the operation continues to step 903; otherwise, the operation continues to step 905.

In step 903, Dz is compared to the product Dx*AR. If in step 903 it is determined that Dz is greater than the product Dx*AR, then:

D0,D1,D2,D3 intersect the top image, and

D4,D5,D6,D7 intersect the bottom image.

The operation then continues to the processing of case 1 as set forth below to determine, for each direction vector Di, the pixel within the top or bottom image intersected by the direction vector Di that corresponds to the direction vector Di.

If in step 903 it is determined that Dz is less than or equal to the product DX*AR, then:

D0,D3,D4,D7 intersect side 0, and

D1,D2,D5,D5 intersect side 2.

The operation then continues to the processing of case 2 as set forth below to determine, for each direction vector Di, the pixel within side 0 or side 2 intersected by the direction vector Di that corresponds to the direction vector Di.

In step 905, Dz is compared to the product Dy*AR. If in step 905 it is determined that Dz is greater than the product Dy*AR, then:

D0,D1,D2,D3 intersect the top image, and

D4,D5,D6,D7 intersect the bottom image.

The operation then continues to the processing of case 3 as set forth below to determine, for each direction vector Di, the pixel within the top or bottom image intersected by the direction vector Di that corresponds to the direction vector Di.

If in step 905 it is determined that Dz is less than or equal to the product Dy*AR, then:

D0,D1,D4,D5 intersect side 1, and

D2,D3,D6,D7 intersect side 3.

The operation then continues to the processing of case 4 as set forth below to determine, for each direction vector Di, the pixel within side 1 or side 3 intersected by the direction vector Di that corresponds to the direction vector Di.

---

Case 1 and Case 3:

deltaX = AR*Dx/Dz
deltaY = AR*Dy/Dz
HgtTop = (NumRowTop−1)/2
WdtTop = (NumColTop−1)/2
HgtTop = (NumRowBot−1)/2
WdtTop = (NumColBot−1)/2
row0 = HgtTop*(1.0 − deltaX)
col0 = WdtTop*(1.0 + deltaY)
row1 = HgtTop*(1.0 + delatX)
col1 = WdtTop*(1.0 + delatY)
row2 = HgtTop*(1.0 + delatX)
col2 = WdtTop*(1.0 − delatY)
row3 = HgtTop*(1.0 − delatX)
col3 = WdtTop*(1.0 − delatY)
row4 = HgtBot*(1.0 + delatX)
col4 = WdtBot*(1.0 + delatY)
row5 = HgtBot*(1.0 − delatX)
col5 = HgtBot*(1.0 + delatY)
row6 = HgtBot*(1.0 − delatX)
col6 = WdtBot*(1.0 − delatY)
row7 = HgtBot*(1.0 + delatX)
col7 = WdtBot*(1.0 − delatY)

---

In case 1 and 3, the variables NumRowTop, NumColTop are the number of rows and columns, respectively, of pixels in the top image. The variables NumRowBot, NumColBot are the number of rows and columns, respectively, of pixels in the bottom image. The pixel of the top image corresponding to the direction vectors D0,D1,D2,D3 are identified by the indices (row0,col0), (row1,col1), (row2,col2), (row3,col3), respectively. And the pixel of the bottom image corresponding to the direction vectors D4,D5,D6,D7 are identified by the indices (row4,col4), (row5,col5), (row6,col6), (row7, col7), respectively.

---

Case 2:

deltaX = Dz/(Ar*Dx)
deltaY = Dy/Dx
Hgt0 = (NumRowSide0−1)/2
Wdt0 = (NumColSide0−1)/2
Hgt2 = (NumRowSide2−1)/2
Wdt2 = (NumColSide2−1)/2
row0 = Hgt0*(1.0 + deltaX)
col0 = Wdt0*(1.0 + deltaY)
row1 = Hgt2*(1.0 + deltaX)
col1 = Wdt2*(1.0 − deltaY)
row2 = Hgt2*(1.0 + deltaX)
col2 = Wdt2*(1.0 + deltaY)
row3 = Hgt0*(1.0 + deltaX)
col3 = Wdt0*(1.0 − deltaY)
row4 = Hgt0*(1.0 − deltaX)
col4 = Wdt0*(1.0 + deltaY)
row5 = Hgt2*(1.0 − deltaX)
col5 = Wdt2*(1.0 − deltaY)
row6 = Hgt2*(1.0 − deltaX)
col6 = Wdt2*(1.0 + deltaY)

---

Case 2:

row7 = Hgt0*(1.0 − deltaX)
col7 = Wdt0*(1.0 − deltaY)

---

In case 2, the variables NumRowSideO, NumColSide0 are the number of rows and columns, respectively, of pixels in the side 0 image. The variables NumRowSide3, NumCol-Side3 are the number of rows and columns, respectively, of pixels in the side 2 image. The pixel of the side 0 image corresponding to the direction vectors D0,D3,D4,D7 are identified by the indices (row0,col0), (row3,col3), (row4, col4), (row7,col7), respectively. And the pixel of the side 2 image corresponding to the direction vectors D1,D2,D5, D6 are identified by the indices (row1,col1), (row2,col2), (row5,col5), (row6,col6), respectively.

---

Case 4:

deltaX = Dz/(Ar*Dy)
deltaY = Dx/Dy
Hgt1 = (NumRowSide1−1)/2
Wdt1 = (NumColSide1−1)/2
Hgt3 = (NumRowSide3−1)/2
Wdt3 = (NumColSide3−1)/2
row0 = Hgtl*(1.0 + deltaX)
col0 = Wdtl*(1.0 − deltaY)
row1 = Hgtl*(1.0 + deltaX)
col1 = Wdtl*(1.0 + deltaY)
row2 = Hgt3*(1.0 + deltaX)
col2 = Wdt3*(1.0 − deltaY)
row3 = Hgt3*(1.0 + deltaX)
col3 = Wdt3*(1.0 + deltaY)
row4 = Hgt1*(1.0 − deltaX)
col4 = Wdt1*(1.0 − deltaY)
row5 = Hgt1*(1.0 − deltaX)
col5 = Wdt1*(1.0 + deltaY)
row6 = Hgt3*(1.0 − deltaX)
col6 = Wdt3*(1.0 − deltaY)
row7 = Hgt3*(1.0 − deltaX)
col7 = Wdt3*(1.0 + deltaY)

---

In case 4, the variables NumRowSide1, NumColSide1 are the number of rows and columns, respectively, of pixels in the side 1 image. The variables NumRowSide3, NumCol-Side3 are the number of rows and columns, respectively, of pixels in the side 3 image. The pixel of the side 1 image corresponding to the direction vectors D0,D1,D4,D5 are identified by the indices (row0,col0), (row1,col1), (row4, col4), (row5,col5), respectively. And the pixel of the side 3 image corresponding to the direction vectors D2,D3,D6, D7 are identified by the indices (row2,col2), (row3,col3), (row6,col6), (row7,col7), respectively.

Similar operations may be used to map a cylindrical environment map (or image) together with a top image and bottom image, more details of which is set forth in U.S. patent application Ser. No. 60/023,143, incorporated by reference above in its entirety, to the octahedral environment map of the present invention. More specifically, the determination as to whether to the direction vectors intersect the top or bottom images or the cylindrical side image is based on comparison of the following values:

HgtP=numRow/2

HgtD=(numCol/(2*PI))*Dz*/sqrt(Dx*Dx+Dy*Dy)

where numRow is the number of rows of pixels representing the sides of the cylinder, and numcol is the number of columns of pixels representing the sides of the cylinder. If HgtD is greater than HgtP, then:

D0,D1,D2,D3 intersect the top image, and

D4,D5,D6,D7 intersect the bottom image.

The operation then continues to the processing of case 5 as set forth below to determine, for each direction vector Di, the pixel within the top image or bottom image intersected by the direction vector Di that corresponds to the direction vector Di.

If HgtD is less than or equal to HgtP, then:

D0,D1,D2,D3,D4,D5,D6,D7 intersects the side image of the cylinder.

The operation then continues to the processing of case 6 as set forth below to determine, for each direction vector Di, the pixel within the side image of the cylinder intersected by the direction vector Di that corresponds to the direction vector Di.

Case 5:

The calculation of row and column indices for Case 5 is equivalent to cases 1 and 3 presented above. In this case, deltax and deltaY are determined by deltax=Dx/(2*Dz)

deltaY=Dy/(2*Dz)

Case 6:

PanRow1 = HgtP + HgtD
PanRow2 = numRow - PanRow1 - 1
PanCol1 = (numCol/PI)*arctan(Dy/Dx)
panCol2 = 2*numCol - PanCol1 - 1
PanCol3 = numCol - PanCol2 - 1
PanCol4 = numCol - PanCol1 - 1
row0 = PanRow1
col0 = PanCol1
row1 = PanRow1
col1 = PanCol2
row2 = PanRow1
col2 = PanCol3
row3 = PanRow1
col3 = PanCol4
row4 = PanRow2
col4 = PanCol1
row5 = PanRow2
col5 = PanCol2
row6 = PanRow2
col6 = PanCol3
row7 = PanRow2
col7 = PanCol4

In case 6, the pixel of the side image of the cylinder corresponding to the direction vectors D0,D1, . . . D7 are identified by the indices (row0,col0), (row1,col1), . . . (row7,col7), respectively.

Figure 10:
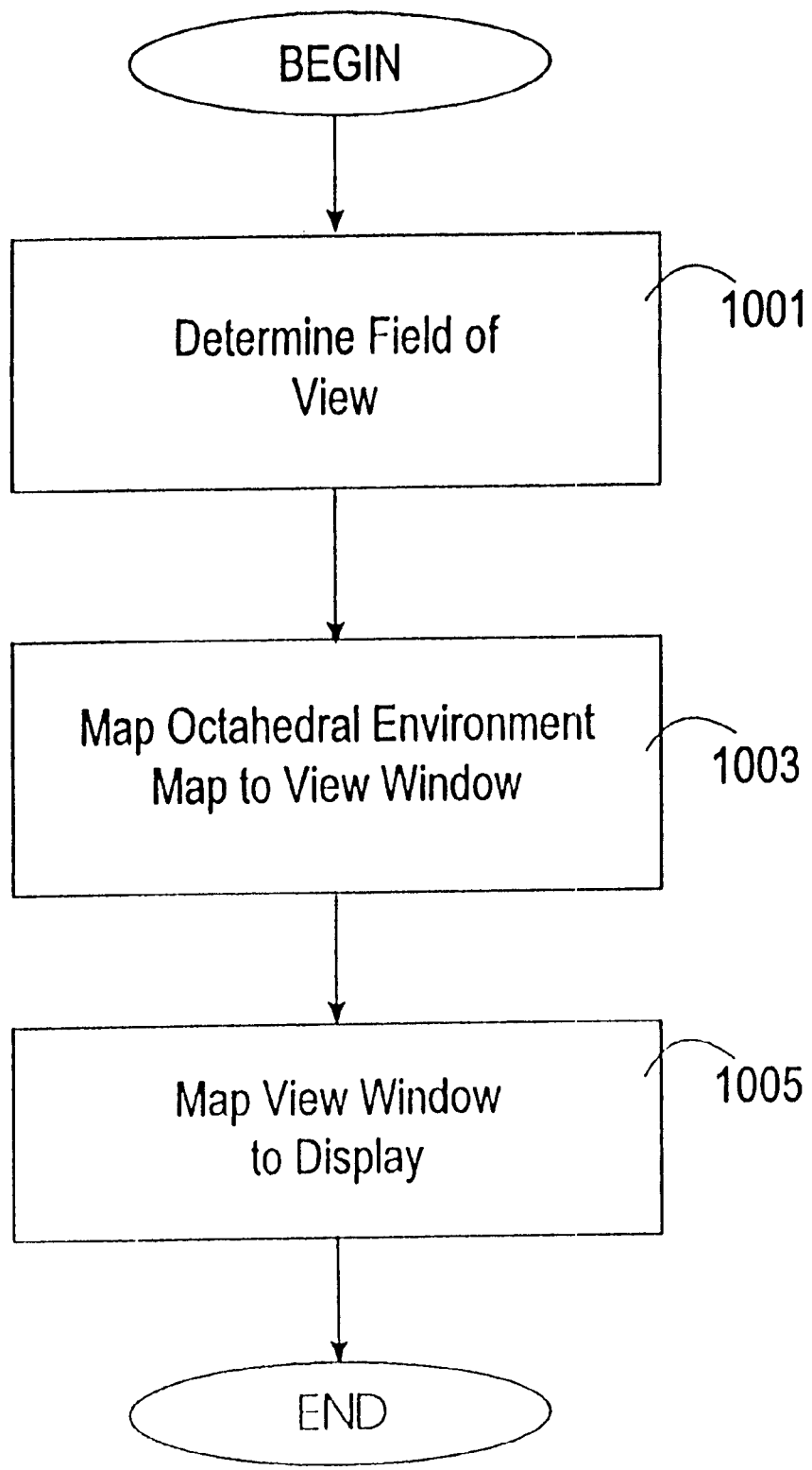
FIG. 10 is a flow chart illustrating operation of the system in rendering the polyhedral environment map of the present invention for display.

Having described a polyhedral environment map that utilizes a triangular data structure to store the information related to the elements of each facet of the polyhedron and a technique to map images to such a polyhedral environment map, a technique to render the polyhedral environment map of the present invention for display is now set forth with reference to FIG. 10. For the sake of description, a technique to render an octahedral environment map that utilizes a triangular data structure is set forth below. However, the present invention is not limited in this respect and can be applied to other polyhedral environment maps.

In step 1001, a field of view is determined. As is conventional, the field of view is preferably characterized by the following parameters: position and orientation of a view plane with respect to an eye (or camera), a horizontal field of view (hfov) and a vertical field of view (vfov). The parameters may be selected based upon user input commands generated, for example, in response to the user manipulating the input device 107 of the computer system.

Figure 11:
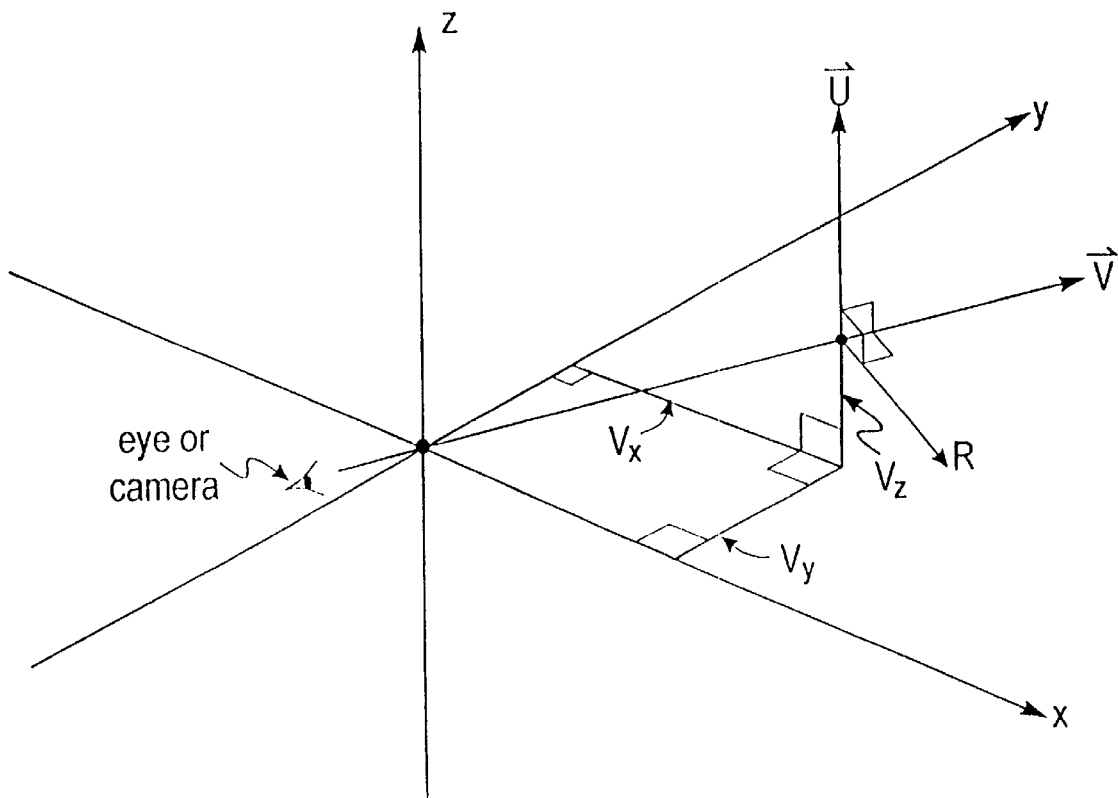
FIG. 11 illustrates the relationship of the view vector, up vector and right vector with respect to the eye.

As shown in FIG. 11, the position of the view plane relative to the eye is given by the components (Vx,vy,Vz) of the view vector (V). The orientation of the view plane relative to the eye is preferably represented by three vectors: a view vector (V), up vector (U) and right vector (R). The eye (or camera) is located at the origin of the octahedron, looking away from the origin in the direction of the view vector (V). Although this diagram places the symbol for the eye or camera behind the origin, this is only to illustrate the direction of view, not the position of the eye or camera. The eye or camera is actually located right on the origin. The vertical axis or up vector (U) is also shown in FIG. 11. The U vector is a unit vector which is perpendicular to the view vector. The up vector is often aligned with the z axis for a heads up orientation, but the up vector can also be tilted away from the z axis to represent a tilted head orientation. The horizontal axis or right vector (R) is determined by the cross product of the view vector (V) and the up vector (U). In order to illustrate the vectors that characterize the eye, the origin of the octahedron may be thought of as the center of the user's head. The view vector (v) points out from between the user's eyes, the up vector (U) points up through the top of the user's skull, and the right vector (R) points out through the right ear of the user.

Figure 12:
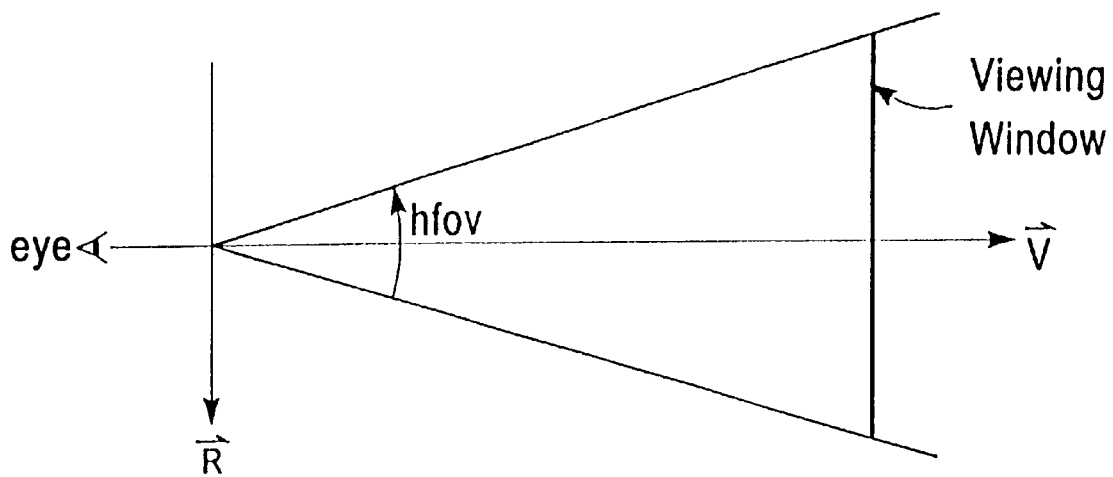
FIG. 12 illustrates the relationship between the view vector, right vector, eye, horizontal field of view and the viewing window.
Figure 13:
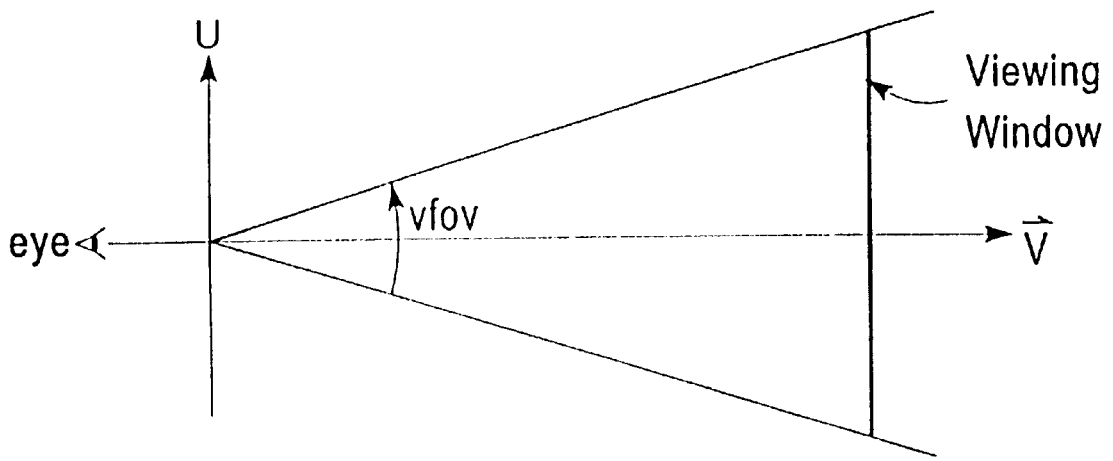
FIG. 13 illustrates the relationship between the view vector, up vector, eye, vertical field of view and the viewing window.

FIG. 12 illustrates the horizontal field of view (hfov) FIG. 13 illustrates the vertical field of view (vfov). The horizontal and vertical field of view parameters (hfov,vfov ) determine the height and width of a view window that lies in the view plane.

In step 1003, the octahedral environment map is mapped to the view window that corresponds to the field of view. A more detailed description of the mapping of the octahedral environment map to the view window is set forth below with respect to FIG. 14

Finally, in step 1005, after mapping the octahedral environment map to the view window, the view window may be mapped to a display or portion of the display. Such a mapping may require scaling and translating the view window to the display device coordinate system. Techniques for such scaling and translating are well known in the field. However, the scaling operation may be avoided in order to increase the performance of the system. In this case, the pixels of the view window must be made to match the pixels if the display window.

Figure 14:
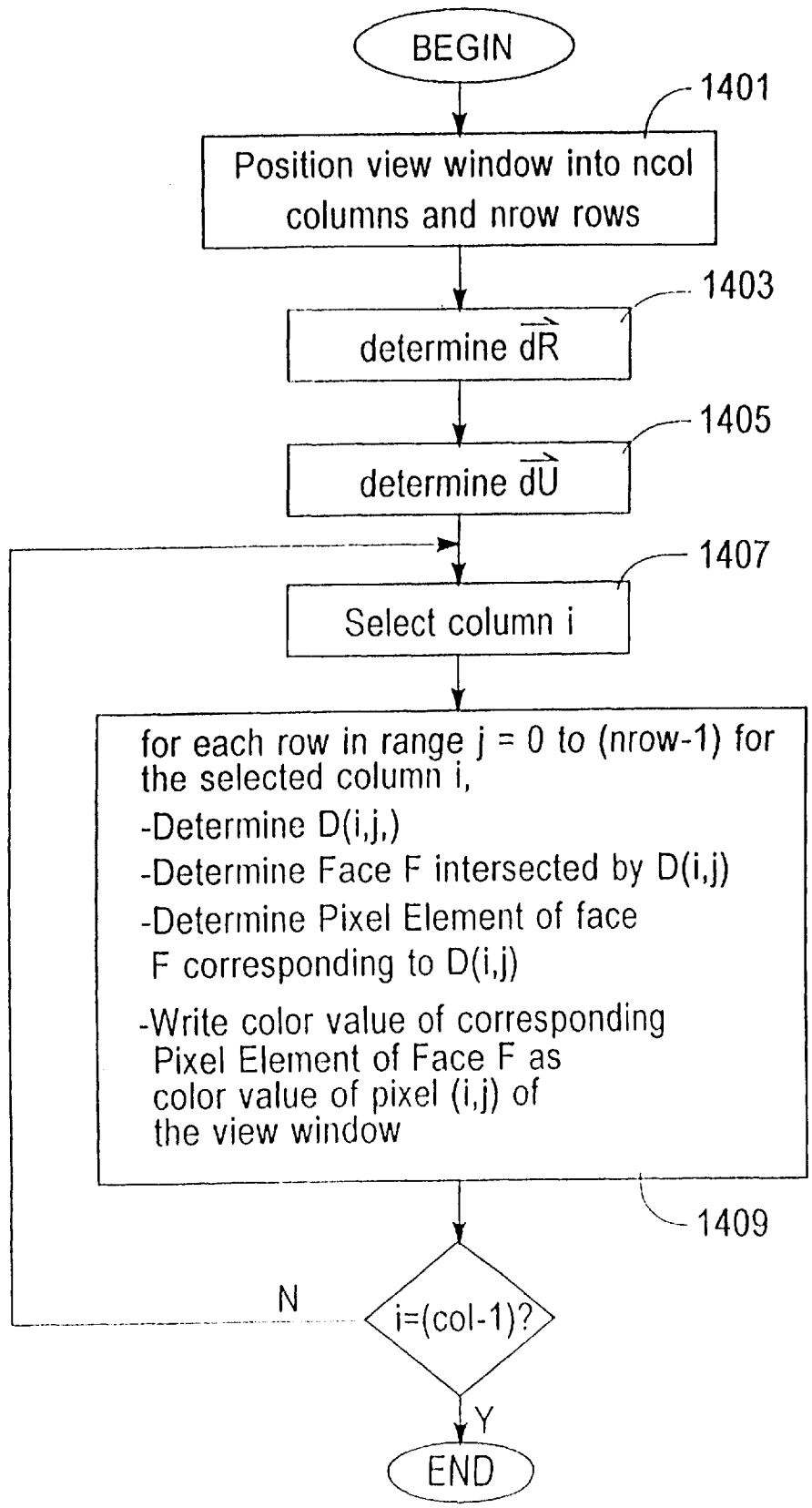
FIG. 14 is a flow chart illustrating the operation of mapping the polyhedral environment map of the present invention to the view window.
Figure 15:
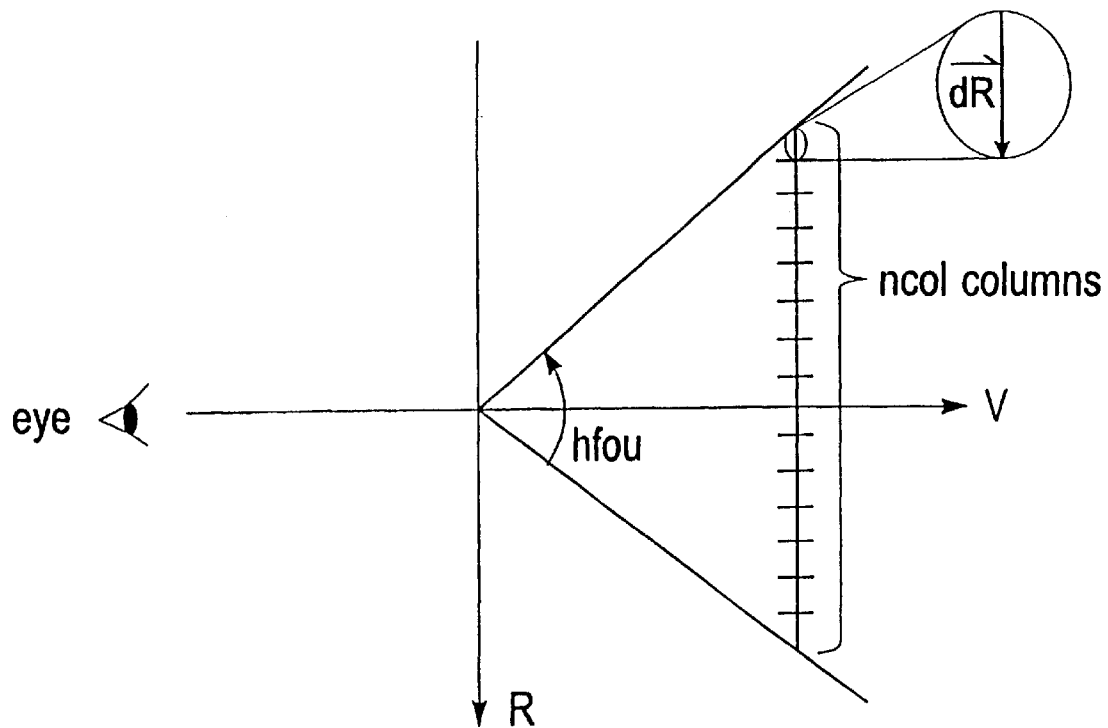
FIG. 15 illustrates the ncol columns of the view plane and the horizontal step vector.

FIG. 14 illustrates the operation of the system in mapping the octahedral environment map to pixels of the view window. In step 1401, the view window is partitioned into ncol evenly spaced columns and nrow evenly spaced rows. In step 1403, a horizontal step vector (dR) is determined. As shown in FIG. 15, the horizontal step vector (dR) is a vector along the right vector R that extends from a given column to the next column of the view window. Preferably, the horizontal step vector (dR) is determined by the product of right vector (R) and scale factor tanstep, where $$tanstep = 2*\tan\left[\frac{\frac{hfov}{2}}{ncol-1}\right]$$

Figure 16:
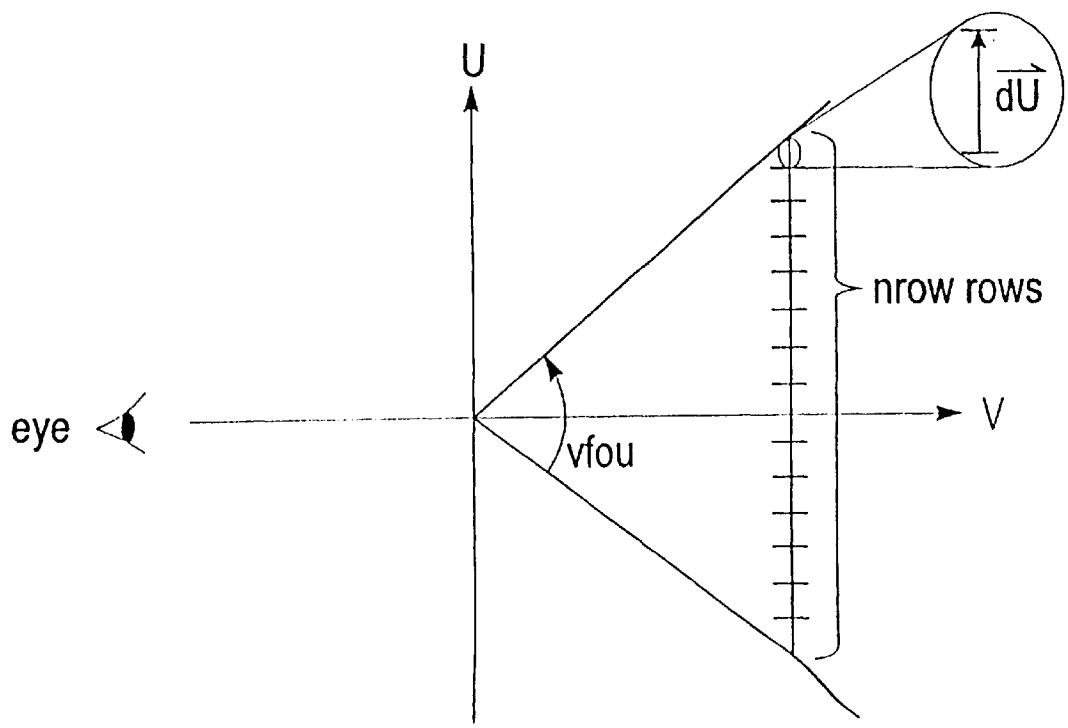
FIG. 16 illustrates the nrow rows of the view plane and the vertical step vector.

In step 1405, a vertical step vector (dU) is determined. As shown in FIG. 16, the vertical step vector is a vector along the up vector (U) that extends from a given row to the next row of the view plane. Preferably, the vertical step vector (dU) is determined by the product of the up vector (U) and the scale factor tanstep.

In step 1407, a column index i is selected that corresponds to one of the columns of the view window. The column index i is preferably initially set to 0. Moreover, the column index i preferably ranges from 0 to (ncol−1). Preferably, the column index i=0 corresponds to the left most column of the view window and the column index i=(ncol−1) corresponds to the right most column of the view window.

Figure 17:
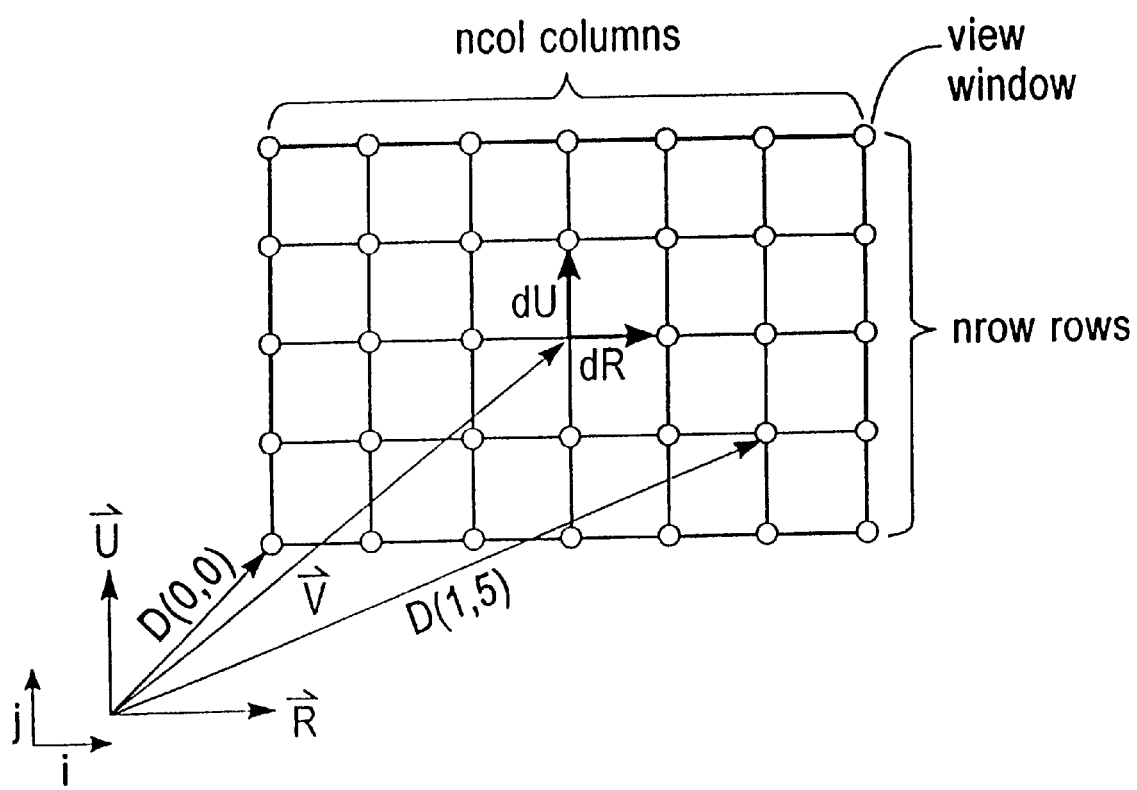
FIG. 17 illustrates the direction vectors that correspond to the elements of the view window, and the relationship of the horizontal and vertical step vectors of FIGS. 15 and 16 to such direction vectors.

In step 1409, for each row of the view window, a row index j is generated that corresponds to the given row. Preferably, the row index j ranges from 0 to (nrow−1). Preferably, the row index j set to 0 corresponds to the bottom row of the view window and the row index j set to (nrow−1) corresponds to the top row of the view window. In addition, in step 1409, for each row of the view window, a direction vector D(i,j) is generated and analyzed as follows. The direction vector D(i,j) that corresponds to a given column and row (i,j) of the view window is preferably defined by the sum of the view vector (V) and multiples of the horizontal and vertical step vectors dR and dU as shown in FIG. 17. More specifically, the direction vector D(i,j) is preferably defined as follows:

If (i,j)=(0,0) (indicating that the row and column indices (i,j) correspond to the lower left hand corner of the view window), the direction vector D(0,0) is generated that represents the direction from the origin of the octahedron to the lower left hand corner of the view window.

If the column index i is 0 and the row index is not 0, (indicating that the row and column indices correspond to the first pixel in a row of the view window, but do not correspond to the lower left hand corner of the view window), the direction vector D(0,j) is generated as follows:

$$D(0,j)=D(0,j-1)+dR$$

If the column index is not 0 and the row index is not 0 (indicating that the row and column indices correspond to a pixel within a row of the view window), the direction vector D(i,j) is generated as follows:

$$D(i,j)=D(i-1,j)+dU$$

The direction vector D(i,j) is then analyzed to determine which face F of the octahedron is intersected by the direction vector D(i,j). The direction vector D(i,j) may be represented in the form D(i,j)=(SxDx,SyDy,SzDz), where Sx,Sy,Sz represent the sign of the components Dx,Dy,Dz of the vector. Preferably, the intersecting face is identified by analyzing the signs Sx,Sy,Sz of the components of the direction vector as set forth in the following table.

| Sx | Sy | Sz | Intersected Face |
|----|----|----|------------------|
| 1  | 1  | 1  | F0 (+x,+y,+z)    |
| −1 | 1  | 1  | F1 (−x,+y,+z)    |
| −1 | −1 | 1  | F2 (−x,−y,+z)    |
| 1  | −1 | 1  | F3 (+x,−y,+z)    |
| 1  | 1  | −1 | F4 (+x,+y,−z)    |
| −1 | 1  | −1 | F5 (−x,+y,−z)    |
| −1 | −1 | −1 | F6 (−x,−y,−z)    |
| 1  | −1 | −1 | F7 (+x,−y,−z)    |

After determining the face F intersected by the direction vector D(i,j), the element (Iface,Jface) of the intersected face F that corresponds to the direction vector D(i,j) is determined.

Preferably, the element (Iface,Jface) is determined as follows:

$$Iface = \frac{(nrow - 1) * (Dx + Dy)}{(Dx + Dy + Dz)}$$

$$Jface = \frac{(Iface * Dy)}{(Dx + Dy)} \text{ if } Iface > 0,$$

$$Jface = 0 \text{ if } Iface = 0$$

where nrow is the dimension of the triangular array for the intersected face F.

The test for Iface=0 in the calculation of Jface is needed to avoid a divide-by-zero condition when (dx+dy)=0.

The values of Iface and Jface represent positions within the intersected face F of the octahedron. The value of Iface represents a vertical position with respect to the z axis of the octahedron. A value of dz=0 implies an equatorial position with Iface=n−1, the maximum value for Iface. A vertical direction vector has dx=dy=0, which leads to Iface=Jface=0.

The value of Jface represents the horizontal position within the row determined by Iface. If dx=0, then Jface=Iface, the maximum value of Jface for this row. If dy=0, then Jface=0, the minimum value of dy for this row. If dx=0 and dy=0, then D(i,j) corresponds to a vertical vector with Iface=0 and Jface=0.

Finally, after determining the element (Iface,Jface) of the intersected face F that corresponds to the direction vector D(i,j), the color of element (Iface,Jface) is copied as the color of pixel (i,j) of the view window, and the processing of step 1409 of the given row is complete.

After the operation of step 1409 is completed for each row of the selected column of the view plane, the operation returns to step 1407 to select the next successive column unless the final column (i=ncol−1) has been selected. After processing the final column, the view window mapping operation is complete.

The polyhedral environment map of the present invention as described above provides for improved performance in the rendering of such a polyhedral environment map. This improved performance results from the use of a triangular data structure in defining the polyhedral environment map, which provides an efficient mechanism for determining which face of the polyhedral environment map is intersected by the direction vectors that correspond to the pixels of the view window when mapping the polyhedral environment map to the view window.

Although the invention has been shown and described with respect to the particular embodiment(s) thereof, it should be understood by those skilled in the art that the foregoing and various other changes, omissions, and additions in the form and detail thereof may be made without departing from the spirit and scope of the invention.

I claim:

1. A method for generating an environment map representing a panoramic scene from at least one image of said panoramic scene, wherein said environment map is CHARACTERIZED BY a plurality of triangular facets, wherein each facet is partitioned into a triangular grid of elements, and wherein each element is associated with a color value representing color of the corresponding element, the method comprising the steps of:

storing in memory color values associated with pixels of said image representing said panoramic scene;
   for at least one element of each facet of said environment map, performing a mapping operation comprising the steps of:
   generating a direction vector corresponding to said element, determining at least one pixels of said image representing said panoramic scene that corresponds to said direction vector, deriving a color value based upon a stored color value associated with said at least one pixels of said image, and storing the derived color value at a location in memory associated with said at least one element of said environment map.

2. The method of claim 1, wherein said direction vector corresponding to said element represents a direction from said element to an origin of said environment map.

3. The method of claim 1, wherein said image of said panoramic scene comprise a plurality of rectangular images.

4. The method of claim 1, wherein said image of said panoramic scene comprise one of a top image and a bottom image.

5. The method of claim 1, wherein said image of said panoramic scene comprises a cylindrical environment map.

6. The method of claim 1, wherein said mapping operation is performed for each element in each facet of said environment map.

7. A program storage device readable by a machine, tangibly embodying a program of instructions executable by the machine to perform method steps for generating an environment map representing a panoramic scene from at least one image of said panoramic scene, wherein said environment map is CHARACTERIZED BY a plurality of triangular facets, wherein each facet is partitioned into a triangular grid of elements, and wherein each element is associated with a color value representing color of the corresponding element, the method comprising:

storing in memory color values associated with pixels of said image representing said panoramic scene;

for at least one element of each facet of said environment map, performing a mapping operation comprising the steps of:

generating a direction vector corresponding to said element, determining at least one pixels of said image representing said panoramic scene that corresponds to said direction vector, deriving a color value based upon a stored color value associated with said at least one pixels of said image, and storing the derived color value at a location in memory associated with said at least one element of said environment map.

8. The program storage device of claim 7, wherein said direction vector corresponding to said element represents a direction from said element to an origin of said environment map.

9. The program storage device of claim 7, wherein said image of said panoramic scene comprise a plurality of rectangular images.

10. The program storage device of claim 7, wherein said image of said panoramic scene comprise one of a top image and a bottom image.

11. The program storage device of claim 7, wherein said image of said panoramic scene comprises a cylindrical environment map.

12. The program storage device of claim 7, wherein said mapping operation is performed for each element in each facet of said environment map.

13. A method for generating a view of an environment map of a panoramic scene, wherein said environment map is CHARACTERIZED BY a plurality of triangular facets, wherein each facet is partitioned into a triangular grid of elements, and wherein each element is associated with a color value representing color of the corresponding element, the method comprising the steps of:

determining a field of view;

determining a view window corresponding to said field of view, wherein said view window comprises an array of pixels identified by a plurality of rows and columns; and mapping said environment map to said view window for display;

wherein said mapping step includes the steps of:

for each pixel of said view window, generating a direction vector corresponding to said pixel of said view window;

determining a facet of said environment map intersected by said direction vector;

determining at least one element of said facet intersected by said direction vector which corresponds to said direction vector;

deriving a color value based upon a color value of said at least one element corresponding to said direction vector;

storing said color value as a color value of said pixel of said view window for display.

14. The method of claim 13, wherein said direction vector includes a plurality of components each having a sign and a magnitude, and said facet of said environment map intersected by said direction vector is determined by analyzing said signs of said components of said direction vector.

15. The method of claim 13, wherein the color value associated with the corresponding element of said environment map represents a red, green and blue component of the corresponding element.

16. The method of claim 13, wherein the color value associated with the corresponding element of said environment map represents an index to a color palette.

17. The method of claim 13, wherein said plurality of triangular facets of said environment map form an octahedron.

18. A program storage device readable by a machine, tangibly embodying a program of instructions executable by the machine to perform method steps for generating a view of an environment map of a panoramic scene, wherein said environment map is CHARACTERIZED BY a plurality of triangular facets, wherein each facet is partitioned into a triangular grid of elements, and wherein each element is associated with a color value representing color of the corresponding element, the method comprising the steps of:

determining a field of view;

determining a view window corresponding to said field of view, wherein said view window comprises an array of pixels identified by a plurality of rows and columns; and mapping said environment map to said view window for display;

wherein said mapping step includes the steps of:

for each pixel of said view window, generating a direction vector corresponding to said pixel of said view window;

determining a facet of said environment map intersected by said direction vector;

determining at least one element of said facet intersected by said direction vector which corresponds to said direction vector;

deriving a color value based upon a color value of said at least one element corresponding to said direction vector;

storing said color value as a color value of said pixel of said view window for display.

19. The program storage device of claim 18, wherein said direction vector includes a plurality of components each having a sign and a magnitude, and said facet of said environment map intersected by said direction vector is determined by analyzing said signs of said components of said direction vector.

20. The program storage device of claim 18, wherein the color value associated with the corresponding element of said environment map represents a red, green and blue component of the corresponding element.

21. The program storage device of claim 18, wherein the color value associated with the corresponding element of said environment map represents an index to a color palette.

22. The program storage device of claim 18, wherein said plurality of triangular facets of said environment map form an octahedron.

* * * * *